(12) United States Patent
Greenberg et al.

(10) Patent No.: US 10,187,410 B2
(45) Date of Patent: Jan. 22, 2019

(54) AUTOMATICALLY PREVENTING AND REMEDIATING NETWORK ABUSE

(71) Applicant: MICROSOFT TECHNOLOGY LICENSING LLC, Redmond, WA (US)

(72) Inventors: Albert Greenberg, Seattle, WA (US); Deepak Bansal, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 14/788,271

(22) Filed: Jun. 30, 2015

(65) Prior Publication Data

US 2017/0006053 A1  Jan. 5, 2017

(51) Int. Cl.

| H04L 29/06 | (2006.01) |
|---|---|
| H04L 29/08 | (2006.01) |
| G06F 21/56 | (2013.01) |
| G06F 21/31 | (2013.01) |
| G06F 21/32 | (2013.01) |

(52) U.S. Cl.
CPC ........ *H04L 63/1425* (2013.01); *G06F 21/316* (2013.01); *G06F 21/32* (2013.01); *G06F 21/566* (2013.01); *H04L 63/145* (2013.01); *H04L 67/10* (2013.01)

(58) Field of Classification Search
CPC ... H04L 63/1425; H04L 67/10; H04L 63/145; G06F 21/566
See application file for complete search history.

(56) References Cited

U.S. PATENT DOCUMENTS 8,505,097 B1   8/2013  Juels et al.
2008/0289042 A1*  11/2008  Bai ................. G06F 21/566
                                                      726/24
(Continued)

FOREIGN PATENT DOCUMENTS

CN   102779297 A   11/2012

OTHER PUBLICATIONS

"International Search Report and Written Opinion Issued in PCT Application No. PCT/US2016/039921", dated Sep. 8, 2016, 11 Pages.

(Continued)

*Primary Examiner* — Meng Li
(74) *Attorney, Agent, or Firm* — Shook, Hardy & Bacon, L.L.P.

(57) ABSTRACT

Various embodiments described herein are directed to optimizing cloud computing infrastructures functionality based on an abuse prevention and remediation platform. A tenant profile may have a tenant confidence score for a tenant, the tenant confidence score being an indicator of the reputation of the tenant usage of cloud computing resources. Based on the confidence score of the tenant, one or more policies for the tenant may be identified limiting access to cloud computing resources. If the virtual internet protocol address (VIP) of the tenant is determined to be tainted, the VIP may be quarantined in a tainted VIP pool, the quarantining excluding the VIP from being selected for use until the VIP is clean. A cleanup routine may be executed, the cleanup routine communicating remedial actions for the tainted VIP. Upon completion of the cleanup routine, the VIP may be restored to a clean VIP pool.

20 Claims, 6 Drawing Sheets

(56) References Cited

U.S. PATENT DOCUMENTS

| | | | | |
|---|---|---|---|---|
| 2011/0252469 | A1* | 10/2011 | Cho | H04L 63/0236 726/13 |
| 2013/0024939 | A1 | 1/2013 | Glew et al. | |
| 2013/0091584 | A1 | 4/2013 | Liebmann et al. | |
| 2013/0124644 | A1* | 5/2013 | Hunt | H04L 51/12 709/206 |
| 2014/0351429 | A1 | 11/2014 | Madani et al. | |
| 2015/0052520 | A1* | 2/2015 | Crowell | G06F 21/566 718/1 |
| 2015/0081767 | A1* | 3/2015 | Evens | H04L 67/30 709/203 |
| 2015/0143527 | A1* | 5/2015 | Brandwine | G06F 9/45558 726/25 |

OTHER PUBLICATIONS

Jeyanthi, et al., "Credit Based Methodology to Detect and Discriminate DDoS Attack from Flash Crowd in a Cloud Computing Environment", In International Journal of Network Security & Its Applications, vol. 5, No. 5, Sep. 2013, 10 pages.

"Vblock™ Solution for Trusted Multi-Tenancy: Technical Overview", In White Paper, Aug. 2011, 76 pages.

"Designing Secure Multi-Tenancy into Virtualized Data Centers", Published on: Mar. 16, 2010 Available at: http://www.cisco.com/c/en/us/td/docs/solutions/Enterprise/Data_Center/Virtualization/securecldg.html.

Zhou, et al., "Owner-centric Protection of Unstructured Data on Smartphones", In Proceedings of 7th International Conference on Trust & Trustworthy Computing, Jun. 30, 2014, 18 pages.

"Configuring the Botnet Traffic Filter", Retrieved on: Dec. 9, 2014 Available at: http://www.cisco.com/c/en/us/td/docs/security/asa/asa83/asdm63/configuration_guide/config/protect_botnet.pdf.

Li, et al., "Detecting Infection Source and Building Predictive Blacklists with an Attack-Source Scoring System", In Proceedings of 8th Annual Symposium on Information Assurance, Jun. 4, 2013, 6 pages.

Aljahdali, et al., "Enhancing Multi-Tenancy Security in the Cloud IaaS Model over Public Deployment", In Proceedings of IEEE 7th International Symposium on Service Oriented System Engineering, Mar. 25, 2013, 6 pages.

Shah, et al., "Security Issues on Cloud Computing", Retrieved on: Dec. 9, 2014 Available at: http://arxiv.org/ftp/arxiv/papers/1308/1308.5996.pdf.

Hofmeyr, et al., "Modeling Internet-Scale Policies for Cleaning up Malware", In Proceedings of Tenth Workshop on Economics of Information Security, Jun. 14, 2011, 22 pages.

Claycomb, et al., "Insider Threats to Cloud Computing: Directions for New Research Challenges", In Proceedings of the IEEE 36th Annual Computer Software and Applications Conference, Jul. 16, 2012, 8 pages.

Kandias, et al., "The Insider Threat in Cloud Computing", In Proceedings of 6th International Conference on Critical Information Infrastructure Security, Sep. 8, 2011, 11 pages.

Marcon, et al., "Trust-based Grouping for Cloud Datacenters: Improving Security in Shared Infrastructures", In Proceedings of IFIP Networking Conference, May 22, 2013, 9 pages.

Ros, et al., "The Threat of Coexisting With an Unknown Tenant in a Public Cloud", In Royal Holloway Series, Jul. 2012, 6 pages.

Iyengar, et al., "A Multilevel Thrust Filtration Defending Mechanism against DDoS Attacks in Cloud Computing Environment", In International Journal of Grid and Utility Computing, vol. 5, No. 4, Oct. 2014, 13 pages.

Du, et al., "Adaptive Data-Driven Service Integrity Attestation for Multi-Tenant Cloud Systems", In Proceedings of the Nineteenth International Workshop on Quality of Service, Jun. 6, 2011, 9 pages.

"International Preliminary Report on Patentability Issued in PCT Application No. PCT/US2016/039921", dated Sep. 6, 2017, 8 Pages.

"Second Written Opinion Issued in PCT Application No. PCT/US2016/039921", dated Apr. 19, 2017, 5 Pages.

* cited by examiner

AUTOMATICALLY PREVENTING AND REMEDIATING NETWORK ABUSE

BACKGROUND

A cloud computing platform can provide users with the ability to build, deploy, and manage services and applications in a distributed computing environment, i.e., the cloud. A tenant of a cloud computing platform need not provide or maintain their own infrastructure when the cloud computing platform is provided by a cloud service provider, allowing the tenant of the cloud computing platform to rapidly deploy services and applications. However, this may lead to abuse by some tenants of the cloud computing platform, such as hosting malicious activities (e.g., spam, viruses, etc.).

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

To prevent abuse of a cloud computing platform, services, such as those providing anti-spam lists, may block Internet Protocol (IP) addresses or provide a mechanism for others to block IP addresses that are known to host malicious activities. However, since the IP addresses used by the tenants may belong to the cloud computing platform itself and tenants may freely leave the cloud computing platform, IP addresses may continue to be blocked even when the malicious tenant is no longer hosted on the cloud computing platform.

Embodiments described herein are directed to optimizing cloud computing infrastructures functionality based on an abuse prevention and remediation platform. For example, a plurality of tenant profile attributes may be tracked, and a tenant profile comprising a tenant confidence score may be generated, where the tenant profile is associated with the tenant profile attributes. The tenant confidence score may be an indicator of the reputation of the tenant usage of cloud computing resources and may correspond to a tenant profile of the tenant. Based on the tenant confidence score, one or more policies for the tenant may be identified, where the policies limit access to cloud computing resources. If a network resource is determined to be tainted, the network resource may be quarantined in a tainted network resources pool, and a cleanup routine may be executed, where the cleanup routine communicates remedial actions for the tainted resource. Upon completion of the cleanup routine, the network resource may be restored in an untainted network resources pool.

Thus, the cloud computing platform may be more reliable and secure (e.g., network resource that are determined to be tainted are cleaned, preventing further abuse), and more efficient (e.g., tenants with low confidence score have limited resource usage, reducing load on the resources). Furthermore, the cloud computing platform can quickly scrub IP addresses with remnant metadata (designated as tainted), thereby reducing the amount of artificially quarantined resources and increasing the pool of available resources in an accurate and efficient manner.

BRIEF DESCRIPTION OF THE DRAWINGS

Aspects of the invention are described in detail below with reference to the attached drawing figures, wherein.

DETAILED DESCRIPTION

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

A cloud computer platform provides users with the ability to host virtual machines (VMs) on the cloud. This provides multiple benefits to the users, such as the ability to quickly deploy and manage services and application without needing to maintain hardware and/or software. Thus, this configuration is favorable to many people who otherwise would not create virtual machines or host services and applications on the cloud. However, given the ease of using virtual machines to host services and applications, malicious users may use the cloud computing platform to host malicious services and applications such as spam, viruses, distributed denial-of-service (DDoS) attacks, or other malicious services and applications.

Some services create blacklists of known "dirty" IP addresses to prevent spam and other abusive content. A "dirty" IP address is an address that has been determined to host these malicious services and applications. These blacklists are used by companies to effectively prevent traffic to and from the dirty IP addresses, where a blacklist is a list of IP addresses that have been determined to host malicious content. Given the nature of a cloud computing platform, however, even if the malicious user is no longer hosted on the cloud computing platform, IP addresses that were used by the malicious user may remain blacklisted until steps are taken to remove the IP address from these blacklists (e.g., the cloud service provider must take the steps to remove the IP address from the blacklists since the IP addresses may belong to the cloud service provider and not the user).

Embodiments are directed to preventing and remediating abuse on the cloud computing infrastructure. For example, malicious services and applications may be prevented from operating on the cloud computing platform by applying policies for the tenant based on a tenant confidence score. The policies may include blocking ports, limiting bandwidth, ordering the priority of traffic, etc. For example, if a tenant has not established their confidence score (i.e., their confidence score is low), policies may be applied to restrict or otherwise limit traffic from the virtual machine of the tenant. As the tenant is able to establish their confidence score (i.e., raise their confidence score), the policies may be adjusted or removed. The tenant may establish their confidence score by such actions as subscribing to a higher level of service, having a record of compliance with cloud usage policies, or timely paying for the subscription to the cloud computing platform. Thus, a tenant of a cloud computing platform may initially be given limited resources in accordance with a tenant confidence score. If a malicious service or application is found on a virtual machine of the tenant, the tenant may be removed from the cloud computing platform. Since a virtual IP address of the virtual machine would no longer be associated with the tenant, it can be recycled for reuse. For example, the tainted virtual IP address may be quarantined in a tainted network resources pool until it is determined to be cleaned. Once the virtual IP address is cleaned (e.g., the blacklist service has removed the virtual IP address from the blacklist), the virtual IP address may be restored in an untainted network resources pool. As used herein, a virtual internet protocol address (VIP) refers to an IP address assigned to a virtual machine that does not correspond to specific device that allows packages to be sent and received by the virtual machine.

Thus, the cloud computing platform may be more reliable and secure (e.g., virtual machines with dirty VIPs are removed, preventing further abuse), and more efficient (e.g., virtual machines for tenants with low confidence scores are limited in their resource usage reducing load on the resources and freeing up resources for use by other tenants, the cloud computing platform may maintain a smaller set of VIPs allowing more improved management and allocation of VIPs). Furthermore, the invention is able to quickly scrub IP addresses with remnant metadata (designated as tainted), thereby reducing the amount of artificially quarantined resources and increasing the pool of available resources in an accurate and efficient manner.

Exemplary Distributed Storage System

Figure 1:
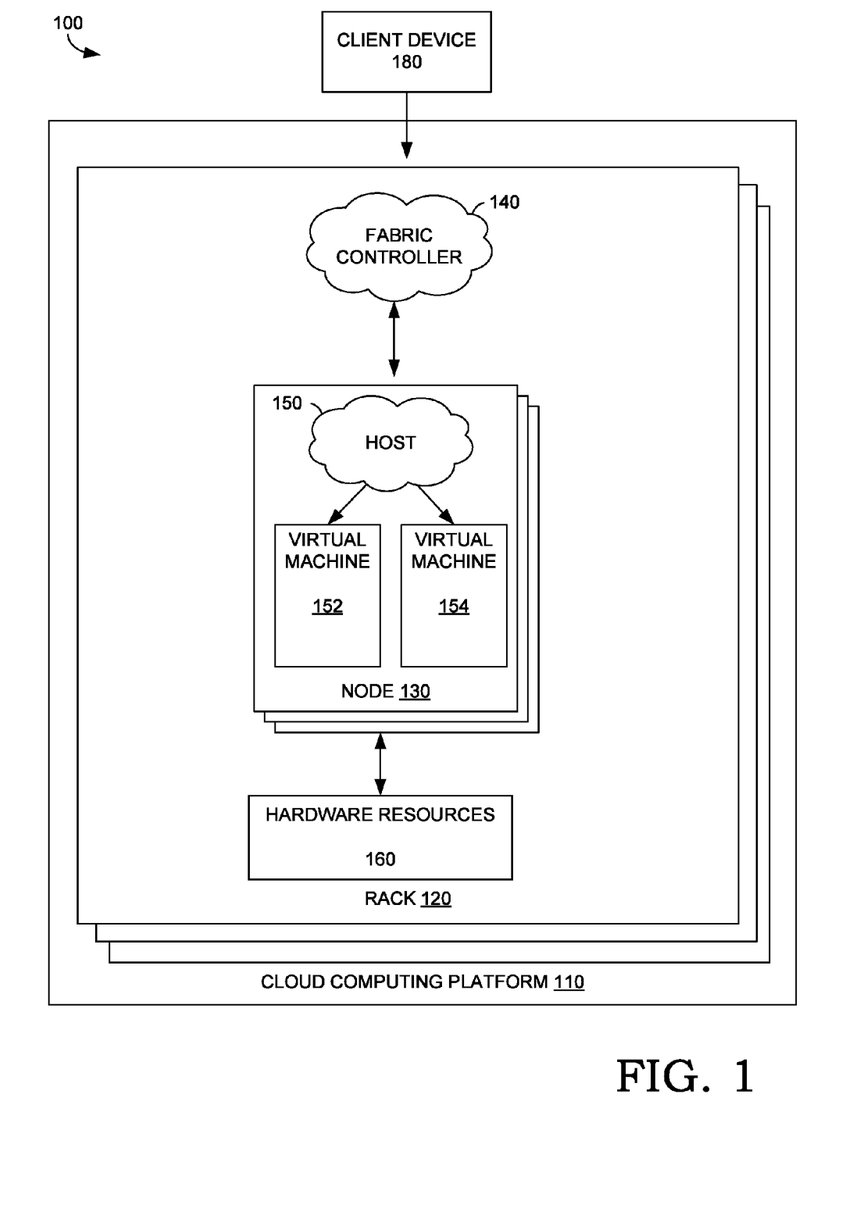
FIG. 1 is a block diagram of an exemplary distributed storage system in which embodiments described herein may be employed.

Referring now to FIG. 1, FIG. 1 illustrates an exemplary distributed computing environment 100 in which implementations of the present disclosure may be employed. In particular, FIG. 1 shows a high level architecture of the system for optimizing cloud computing infrastructures functionality based on an abuse prevention and remediation platform ("optimization system") comprising a cloud computing platform 110. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 100 that includes the cloud computing platform 110, rack 120, and node 130 (e.g., computing devices, processing units, or blades) in rack 120. The optimization system can be implemented with a cloud computing platform 110 that runs cloud services across different data centers and geographic regions. The cloud computing platform 110 can implement a fabric controller 140 component for provisioning and managing resource allocation, deployment, upgrade, and management of cloud services. Typically, the cloud computing platform 110 acts to store data or run service applications in a distributed manner. The cloud computing platform 110 in a data center can be configured to host and support operation of endpoints of a particular service application. The cloud computing platform 110 may be a public cloud, a private cloud, a hybrid cloud, or a dedicated cloud.

The node 130 can be provisioned with a host 150 (e.g., operating system or runtime environment) running a defined software stack on the node 130. Node 130 can also be configured to perform specialized functionality (e.g., compute nodes or storage nodes) within the cloud computing platform 110. The node 130 is allocated to run one or more portions of a service application of a tenant. A tenant can refer to a customer utilizing resources of the cloud computing platform 110. Service application components of the cloud computing platform 110 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 130, the nodes may be partitioned into virtual machines (e.g., virtual machine 152 and virtual machine 154). Physical machines can also concurrently run separate service applications. The virtual machines or physical machines can be configured as individualized computing environments that are supported by resources 160 (e.g., hardware resources and software resources) in the cloud computing platform 110. It is contemplated that resources can be configured for specific service applications. Further, each service application may be divided into functional portions such that each functional portion is able to run on a separate virtual machine. In the cloud computing platform 110, multiple servers may be used to run service applications and perform data storage operations in a cluster. In particular, the servers may perform data operations independently but exposed as a single device referred to as a cluster. Each server in the cluster can be implemented as a node.

Client device 180 may be linked to a service application in the cloud computing platform 110. The client device 180 may be any type of computing device, which may correspond to computing device 600 described with reference to FIG. 6, for example. The client device 180 can be configured to issue commands to cloud computing platform 110. In embodiments, client device 180 may communicate with service applications through a virtual IP and load balancer or other means that directs communication requests to designated endpoints in the cloud computing platform 110. The components of cloud computing platform 110 may communicate with each other over a network (not shown), which may include, without limitation, one or more local area networks (LANs) and/or wide area networks (WANs).

Having described various aspects of the distributed computing environment 100 and cloud computing platform 110, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure.

Exemplary Network Manager System

Figure 2:
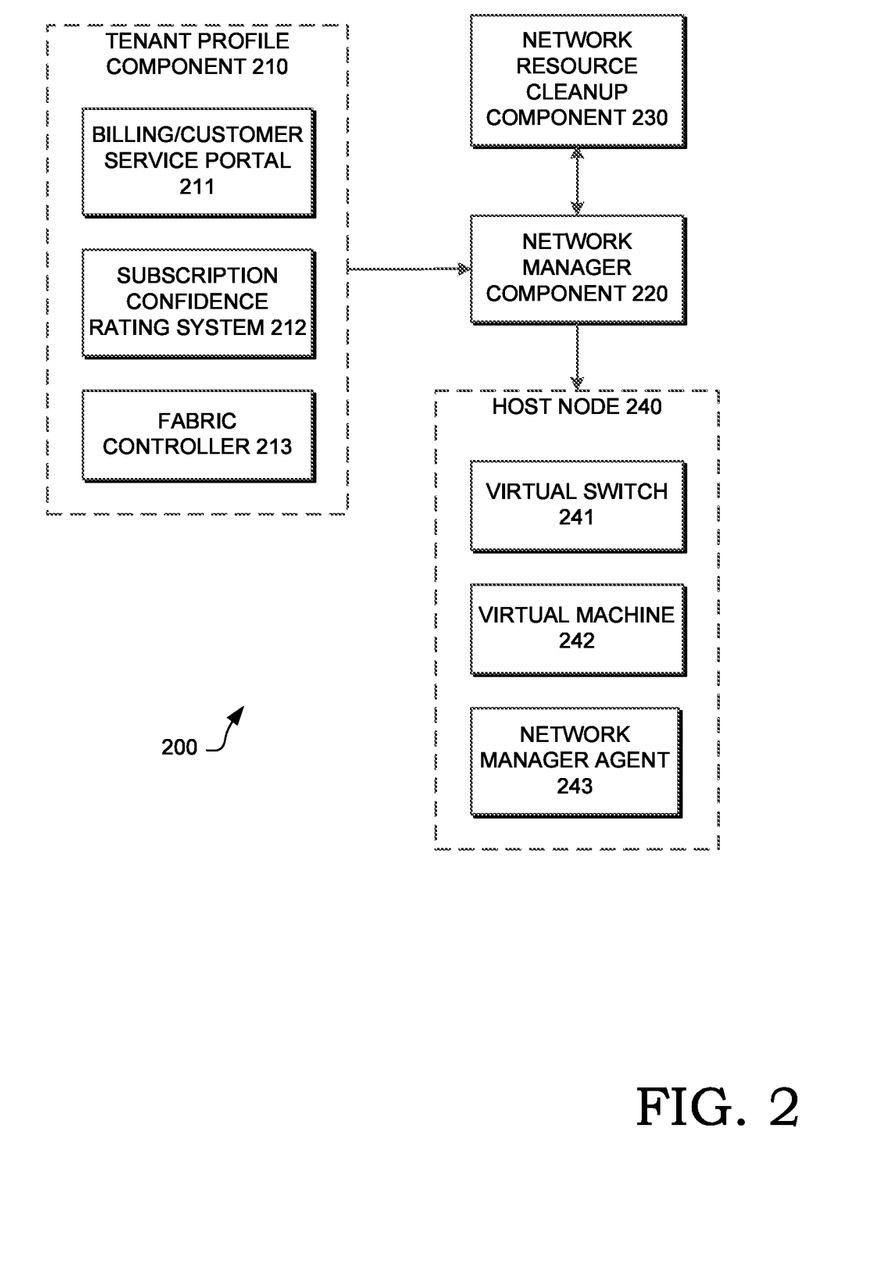
FIG. 2 is a block diagram of an exemplary computing environment suitable for preventing and remediating network abuse, in accordance with embodiments described herein.

FIG. 2 illustrates an exemplary network manager system, in accordance with an aspect of the present invention. A network manager system 200 may include a tenant profile component 210, network manager component 220, network resource cleanup component 230, and a host node 240. The network manager system can include abuse prevention and remediation platform components that refer to integrated components that facilitate preventing and remediating network abuse. The integrated components refer to the hardware architecture and software framework that support network abuse prevention and remediation functionality described herein. The hardware architecture refers to physical components and interrelationships thereof, and the software framework refers to software providing functionality that can be implemented with hardware operated on a device. The end-to-end software-based abuse prevention and remediation platform can operate within the components to operate computer hardware to provide abuse prevention and remediation functionality. As such, the platform components can manage resources and provide services for the abuse prevention and remediation functionality. Any other variations and combinations thereof are contemplated with embodiments of the present invention.

By way of example, the platform can include an API library that includes specifications for routines, data structures, object classes, and variables may support the interaction the hardware architecture of the device and the software framework of the unified abuse prevention and remediation platform system. These APIs include configuration specifications for the platform such that the platform components can communicate with each other, as described herein. The tenant profile component 210 may include a billing/customer service portal 211, subscription confidence rating system 212, and fabric controller 213. The tenant profile component 210 may be configured for tracking a plurality of tenant profile attributes, where tenant profile attributes facilitates quantifying tenant confidence scores; generating a tenant profile comprising a tenant confidence score, where the tenant profile is associated with the tenant profile attributes that define the tenant confidence score and the tenant confidence score is an indicator of a reputation of tenant usage of cloud computing resources; and communicating a tenant confidence score for one or more tenants. For example, the billing/customer service portal 211 may provide subscription billing history to the subscription confidence rating system 212. If a tenant confidence score is calculated partly based on the history of billing for the tenant, the billing/customer service portal 211 may provide the payment history of the tenant as a tenant profile attribute to the subscription confidence rating system 212. For example, for tenants with a long history of timely payments, the tenant confidence score may be scored higher than for a tenant with a short history of payments or a tenant with missed or delinquent payments. The billing/customer service portal 211 may also provide other factors used to calculate the tenant confidence score for a tenant. For example, the billing/customer service portal 211 may indicate the type of subscription (e.g., free subscription, enterprise agreement, etc.), history of subscription, past behavior, etc.

The subscription confidence rating system 212 may compute the tenant confidence scores based on tenant profile attributes. For example, the tenant confidence score may use as input the billing history of a tenant from the billing/customer service portal 211. Furthermore, other tenant profile attributes may be received from other components. For example, the past behavior of the tenant may be received from, e.g., the network manager component 220. If the virtual machine of the tenant is suspected to have fraudulent services (e.g., packages sent via the virtual machine have indications of fraudulent activity), this information can be sent to the subscription confidence rating system 212 to compute the tenant confidence score.

Tenant profile attributes may include a history of billing of the tenant, a tracked usage behavior of the tenant, a service model of the tenant, a code of the tenant infrastructure, a type of agreement between the tenant and a provider the tenant infrastructure, an authentication of the tenant, or a combination thereof. For example, a history of billing can include the number of payment received, the number of delinquent payments, the method of payments, etc. Tracked usage behavior of a tenant can include tenant activities over a period of time, from which a cloud computing provider can indirectly or directly infer malicious activities by the tenant. Also, the service model of a tenant might include specific components that are consistent with previously observed malicious activity. The code of the tenant infrastructure may include known fraud patterns or perform unusual activities. It should be understood that the examples are meant to be illustrative rather than restrictive, and that other attributes may be contemplated.

The fabric controller 213 may provision resources to tenants. The fabric controller 213 supports provisioning and managing resource allocation, deployment, upgrade, and management of cloud services. For example, the fabric controller may assign VIPs to tenants.

The network manager component 220 may access a tenant confidence score associated with a tenant from the tenant profile component 210 and identify one or more policies for the tenant having the tenant confidence score, the policies limiting access to cloud computing resources. It is contemplated that individual policies can correspond to specific tenant profile attributes that define the tenant score, such that the tenant score and the individual tenant attributes are factors when identifying a policy to apply on a tenant. For example, a tenant score can be defined and the particular tenant profile attribute that impacts the score is observed usage behavior that is potentially harmful on network bandwidth of the cloud. As such, the particular policy implemented can be a network bandwidth throttling policy. In this regard, both the tenant score and a particular tenant profile attribute can determine a selected policy to apply to the tenant. The policies may be communicated to apply the policies on the tenant infrastructure. The network manager component 220 may also maintain a separate list of clean and dirty VIPs. The network manager component 220 may access the tenant confidence score upon update of a tenant profile, adjust the policies applied to the tenant infrastructure based on the change in the tenant confidence score, and communicate an indication to apply the adjusted policies on the tenant infrastructure. The adjusting of the policies may include selecting one or more policies that throttle network activity or un-throttle network activity of the tenant infrastructure based on the tenant confidence score. For example, the bandwidth available to a tenant or the number of packages being sent may be throttled. Other throttling of network activity may also be contemplated. In some embodiments, the network manager component 220 may invoke application of the one or more policies on the tenant infrastructure.

The network resource cleanup component 230 may receive dirty VIPs from the network manager component 220 and return clean VIPs. For example, if an IP address has been determined to be dirty, the network manager component 220 may indicate the IP address to the network resource cleanup component 230. The network resource cleanup component may quarantine the network resource in a tainted network resources pool until the network resource has been determined to be untainted. The network resource cleanup component 230 may execute a cleanup routine, e.g., using an automated API, the cleanup routine communicating remedial actions for the tainted resource. For example, the network resource cleanup component 230 may communicate to blacklist service providers that the IP address is no longer used by the tenant and may take steps to remove the IP address from the blacklist. In some embodiments, the network resource cleanup component 230 may determine what caused the IP address to appear on the blacklist, resolve the reasons for the IP address appearing on the blacklist, and communicate to the blacklist service provider the steps that were taken to resolve the reasons for the IP address appearing on the blacklist. Once the IP address is determined to be clean, network resource cleanup component 230 may restore the VIP in an untainted network resources pool.

A VIP may be marked dirty (i.e., determined to be tainted) if an indication that the VIP has been placed on a blacklist or an indication that the VIP has been blocked by a firewall has been received. Although, the policies for the tenant limit access to cloud computing resources, the tenant may still perform malicious activities on the cloud computing platform, causing the VIP to be determined to be dirty. Even if the tenant no longer uses the cloud computing platform, the VIP will continue to be dirty until it is, e.g., removed from the blacklist. Thus, when a VIP has been marked dirty, the network manager component 220 does not allocate it to future tenants until the network resource cleanup component 230 has executed the cleanup routine and the VIP is clean.

The host node 240 may include a virtual switch 241, virtual machine 242, and network manager agent 243. The virtual switch 241 allows communication between one or more virtual machines. The virtual switch may be configured for identifying the virtual machine of the tenant infrastructure and instructing the network manager agent 243 to implement the one or more policies on the virtual machine. The virtual machine 242 is an operating system or application environment that is installed on the cloud computing platform that acts as a dedicated system for a user. Multiple virtual machines may be hosted on a single server and may communicate via the virtual switch 241. The network manager agent 243 may receive the policies from the network manager component 220 and apply the policies in the host packet filter for the virtual machines belonging to the tenant based on the confidence rating of the tenant. These policies may set throttles and/or access control lists (ACLs) on User Datagram Protocol (UDP)/Transmission Control Protocol (TCP) or connection rate, or may limit connectivity to certain ports and IPs. The network manager agent 243 may also measure virtual machine activity and deliver that information to the network manager component 220 so that the network manager component 220 can adjust its policies based on the past behavior of the virtual machine.

Having described various aspects of the network manager system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

Exemplary Method for a Preventing and Remediating Network Abuse

Figure 3:
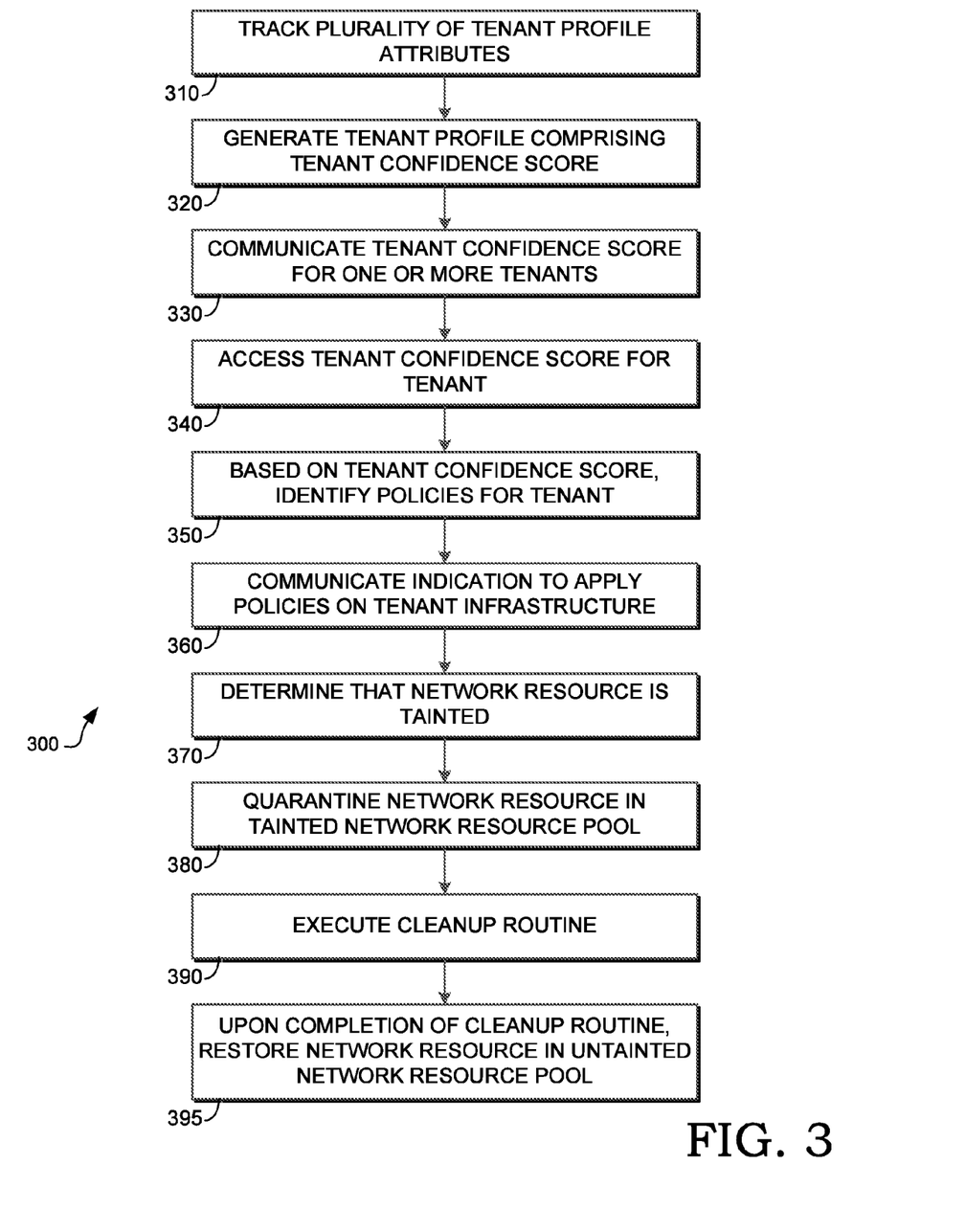
FIG. 3 is a flowchart showing a method for optimizing cloud computing infrastructures functionality based on an abuse prevention and remediation platform, in accordance with embodiments described herein.

Turning now to FIG. 3, a method 300 for preventing and remediating network abuse from tenants in the cloud is shown, in accordance with an aspect of the present invention. Method 300 may be performed on a one or more servers in a data center or across multiple data centers.

At step 310, a plurality of tenant profile attributes may be tracked, the tenant profile attributes facilitating quantifying tenant confidence scores. Tenant profile attributes may include a history of billing of the tenant, a tracked usage behavior of the tenant, a service model of the tenant, a code of the tenant infrastructure, a type of agreement between the tenant and a provider the tenant infrastructure, an authentication of the tenant, or a combination thereof. For example, a history of billing may include the number of payment received, the number of delinquent payments, the method of payments, etc.

At step 320, a tenant profile comprising a tenant confidence score may be generated, the tenant profile being associated with the plurality of tenant profile attributes that define the tenant confidence score and the tenant confidence score being an indicator of a reputation of tenant usage of cloud computing resources. For example, the tracked usage behavior, the service model, and code of the tenant may be compared to known fraudulent usage behavior, service model, and code. If the tracked usage behavior, the service model, and code of the tenant are similar to known fraudulent usage behavior, service model, and code, the tenant confidence score may be lowered.

At step 330, a tenant confidence score may be communicated for one or more tenants, and at step 340, the tenant confidence score may be accessed for a tenant, the tenant confidence score corresponding to a tenant profile of the tenant.

At step 350, based on the tenant confidence score, one or more policies may be identified for the tenant having the confidence score, the one or more policies limiting access to cloud computing resources. For example, the one or more policies may include blocking outgoing Simple Mail Transfer Protocol (SMTP) ports, blocking Remote Desktop Protocol (RDP) ports, blocking UDP ports, limiting TCP and UDP traffic, limiting bandwidth, ordering priority of traffic and limiting rate of SYN (synchronization) packets. In some embodiments, a threshold value is used to determine appropriate actions to take based on the confidence score. For example, if the tenant confidence score is below a certain value, all SMTP ports may be blocked.

At step 360, an indication to apply the one or more policies on the tenant infrastructure may be communicated. For example, the network manager component 220 in FIG. 2 may instruct the network manager agent 243 to apply the one or more policies. As the tenant confidence score changes over time, the one or more policies may change allowing greater or less restrictions on the usage of computing resources.

At step 370, a network resource may be determined to be tainted. For example, a blacklist service may indicate that the VIP of the virtual machine is on a blacklist. In some embodiments, the network resource may be determined to be tainted based on the tenant confidence score. For example, if the tenant confidence score is lower than a threshold, the network resource may be determined to be tainted.

At step 380, the network resource may be quarantined in a tainted network resources pool, and at step 390, a cleanup routine may be executed, the cleanup routine communicating remedial actions for the tainted resource. For example, if the network resource is determined to be tainted, the network resource may be disassociated with the tenant. In some embodiments, the network resource has been placed on a blacklist, and so, remedial action may need to be taken to remove the network resource from the blacklist. For example, the cleanup routine may perform validation with the blacklist service to demonstrate that the network resource is no longer tainted.

At step 395, upon completion of the cleanup routine, the network resource may be restored in an untainted network resources pool. This allows the network resource to be reused by another tenant (or the same tenant if the tenant is retained).

Figure 4:
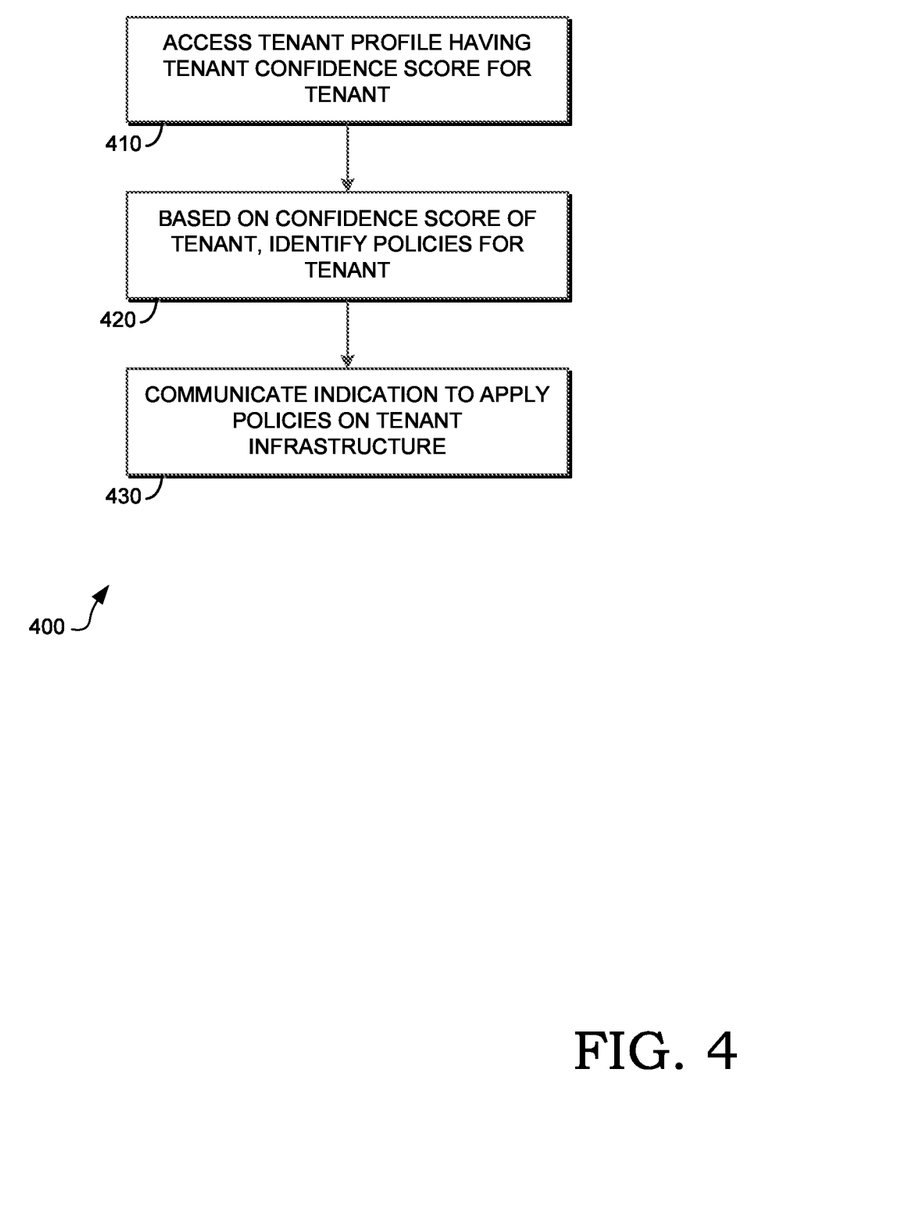
FIG. 4 is a flowchart showing another method for optimizing cloud computing infrastructures functionality based on an abuse prevention and remediation platform, in accordance with an embodiments described herein.

Turning now to FIG. 4, another method 400 for optimizing cloud computing infrastructures functionality based on an abuse prevention and remediation platform is shown, in accordance with another aspect of the present invention. Method 400 may be performed on one or more servers in a data center or across multiple data centers.

At step 410, a tenant profile having a tenant confidence score for a tenant may be accessed. Each tenant may be given a tenant confidence score, where the tenant confidence score is an indicator of a reputation of tenant usage of cloud computing resources. For example, if a tenant has recently subscribed to the cloud computing platform (i.e., is a new tenant), there may be little history of the tenant. Thus, measures may be desired to prevent the tenant from performing certain operations until the tenant has been verified or otherwise given a higher tenant confidence score. The tenant confidence score may be generated based a plurality of tenant profile attributes, where the tenant profile attributes facilitate quantifying tenant confidence scores. A tenant profile comprising a tenant confidence score may be generated, where the tenant profile is associated with the plurality of tenant profile attributes that define the tenant confidence score and the tenant confidence score is an indicator of the reputation of tenant usage of cloud computing resources. For example, a tenant profile attribute may be the level of subscription to the cloud computing platform and the level of subscription may be given a value used to calculate the tenant confidence score. As another example, packages sent by the tenant on a virtual machine may be tracked. Patterns of the packages may be analyzed to determine a threat rating (e.g., the likelihood that the packages are malicious) and the threat rating may be used to calculate the tenant confidence score. Thus, the tenant confidence score may be used to quantify a reputation of tenant usage of cloud computing resources.

At step 420, based on the confidence score of the tenant, one or more policies may be identified for the tenant. In some embodiments, the one or more policies may limit access to cloud computing resources. For example, the tenant may be given a lower priority for operations on their virtual machine. Thus, operation of a higher priority may be performed before the operations of a lower priority are performed. As another example, certain ports may be blocked. Thus, the tenant may only use those ports that are not blocked, limiting the types of operations that can be performed on the virtual machine.

Other policies may also be envisioned. In some embodiments, the policies may include protocols policies, where a protocol policy may include blocking outgoing Simple Mail Transfer Protocol (SMTP) ports, blocking Remote Desktop Protocol (RDP) ports, blocking User Datagram Protocol (UDP) ports or limiting Transmission Control Protocol (TCP) and UDP traffic. In some embodiments, the policies may include bandwidth policies, where a bandwidth policy may include limiting the amount of bandwidth available to the tenant to the tenant infrastructure. In some embodiments, the policies may include tenant priority policies, where a tenant priority policy may include ordering the priority of traffic or limiting a rate of SYN (synchronization) packets. In some embodiments, the policies may include tenant removal policies, where a tenant priority policy may include disabling tenant infrastructure and placing the VIP in a tainted VIP pool for further investigation.

At step 430, an indication to apply the one or more policies on the tenant infrastructure may be communicated. For example, the one or more policies on the tenant infrastructure may be communicated to a network manager agent, instructing the network manager agent to implement the policies on the tenant infrastructure. In some embodiments, a virtual switch of a host node having a virtual machine of the tenant infrastructure and a network manager agent running on the virtual machine may instruct the network manager agent to implement the one or more policies on the virtual machine.

In some embodiments, the tenant profile may be periodically accessed, allowing the tenant confidence score to be updated. For example, if a tenant does not have suspicious activity (e.g., the activities on the virtual machine do not trigger any flags), their confidence score may increase. The one or more policies applied to the tenant infrastructure may be altered based on a change in the tenant confidence score, where the change in the tenant confidence score is based on tracked attributes in the tenant profile. For example, a tracked attribute may be the number of packages sent. An indication to apply the one or more policies on the tenant infrastructure may be communicated. For example, the network manager agent may be instructed to implement the altered one or more policies on the virtual machine. Thus, the tenant confidence score may be constantly updated to reflect the most current state of the tenant.

Figure 5:
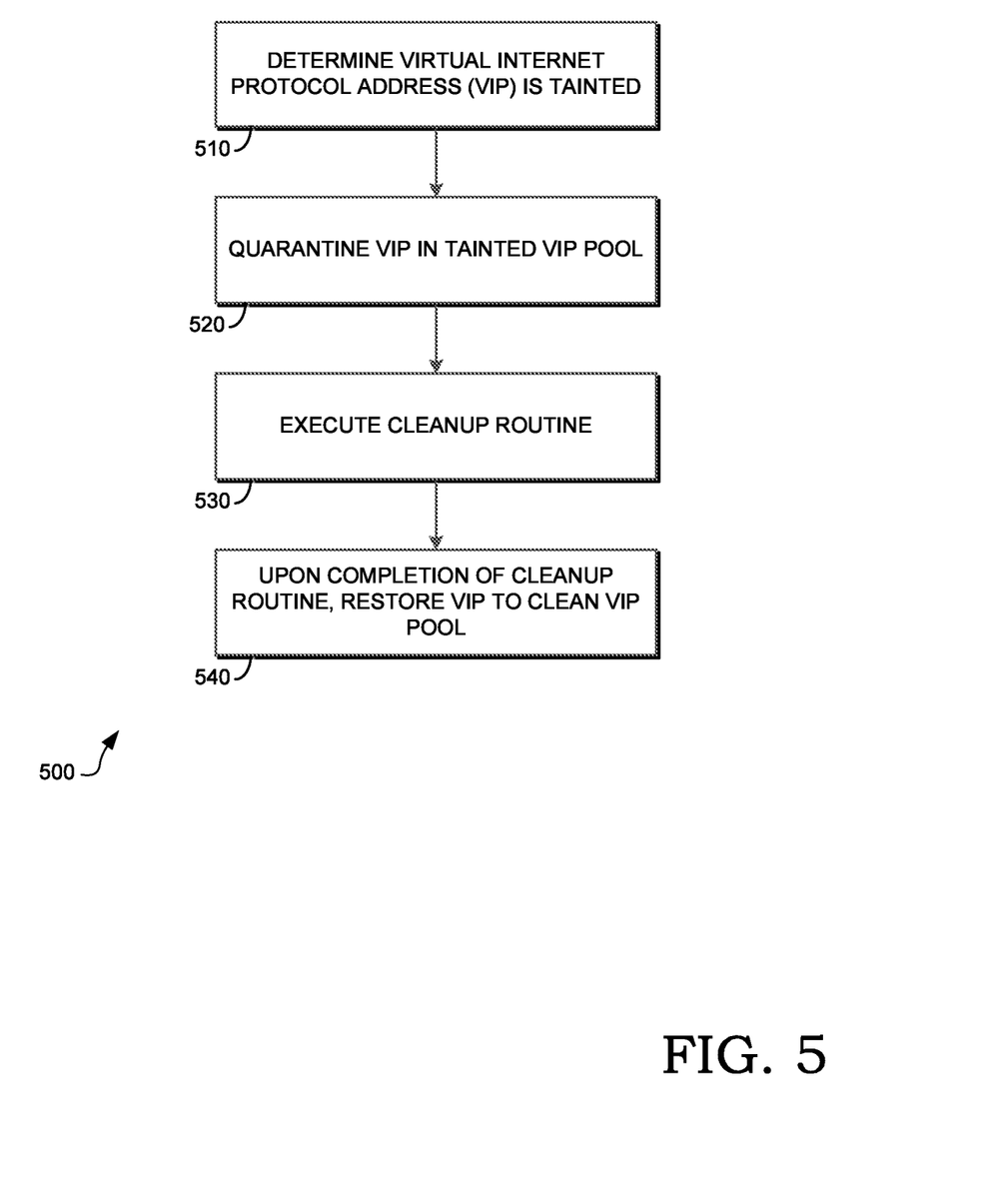
FIG. 5 is a flowchart showing another method for optimizing cloud computing infrastructures functionality based on an abuse prevention and remediation platform, in accordance with an embodiments described herein.

Turning now to FIG. 5, another method 500 for optimizing cloud computing infrastructures functionality based on an abuse prevention and remediation platform is shown, in accordance with another aspect of the present invention. Method 500 may be performed on one or more servers in a data center or across multiple data centers.

At step 510, it is determined that a VIP is tainted. In some embodiments, a VIP can be determined to be tainted by being put on a blacklist of tainted VIPs. For example, a provider of a blacklist of blocked IP addresses may periodically update the blacklist with VIPs that have been identified as being malicious. Services, such as an email service, may receive the blacklist and block communication from VIPs found on the blacklist. In some embodiments, a VIP can be determined to be tainted by being blocked by a firewall. Thus, an indication that a VIP is tainted can be received by the cloud service provider. Although, determining that a VIP is tainted is described above, it should be understood that the descriptions are illustrative and are not intended to limit the determining. For example, a VIP can be determined to be tainted by analyzing packages being sent via the VIP. For example, known malicious patterns can be identified, and if the packages being sent via the VIP conform to one of the known patterns, the VIP may be flagged as being tainted.

At step 520, the VIP may be quarantined in a tainted VIP pool. For example. A pool of tainted VIPs may be kept, where the VIPs in the tainted VIP pool are prevented from being used on the cloud computing platform. Thus, while a VIP resides in the tainted VIP pool, it may be kept out of circulation (e.g., selected for reuse) until the VIP is clean. The pool of tainted VIPs may include information such as the VIP, name of the tenant, date of discovery, and/or other information used to clean the VIP with the blacklist providers. In some embodiments, the pool of tainted VIPs may only contain the VIP and the information to clean the VIP may be retrieved, e.g., by tenant information.

At step 530, a cleanup routine may be executed. The cleanup routine may communicate remedial actions for the tainted VIP. In some embodiments, the cleanup routine may be automated based on Application Programming Interfaces (APIs) that facilitate communicating the remedial actions to a provider of the blacklist. In some embodiments, communicate remedial actions may include communicating one or more tracked attributes of a tenant associated with the VIP. For example, information on the packages being sent via the VIP may be communicated. In some embodiments, remedial action may include suspending the tenant, deleting the virtual machine of the tenant, blocking or throttling resources of the virtual machine, reporting the VIP to blacklist providers, etc. For example, if a VIP has been determined to be tainted, a cleanup routine may block a tenant from performing operations on the cloud computing environment.

At step 540, upon completion of the cleanup routine, the VIP may be restored to a clean VIP pool. For example, a clean VIP pool may contain VIPs that may be allocated to new tenants of the cloud computing platform. Thus, when a new tenant subscribes to the cloud computing platform, the tenant may be allocated a VIP from the clean VIP pool. In some embodiments, all VIP that are not in the tainted VIP pool may be kept in the clean VIP pool and the VIPs may be identified whether they have been allocated (i.e., are in use by a tenant).

These configurations ensure that a dirty VIP is cleaned and recycled for reuse. By guaranteeing that the VIP is clean, only those VIPs that are clean remain on the cloud computing platform allowing for more efficient resource management (e.g., since dirty VIPs do not use resources) and effective management of VIPs.

Exemplary Operating Environment

Figure 6:
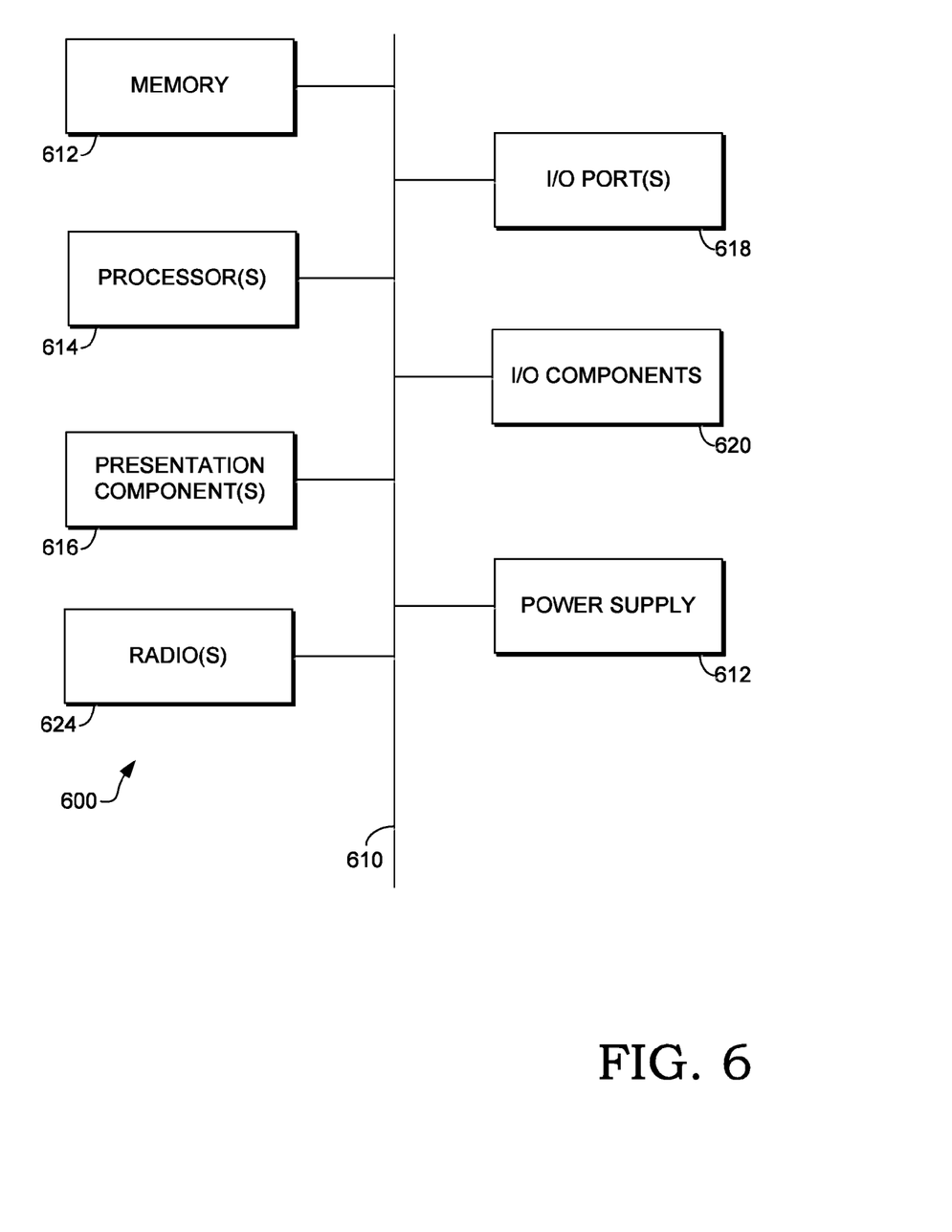
FIG. 6 is a block diagram of an exemplary computing environment suitable for implementing aspects of the invention.

An exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component 620. Also, processors have memory. The inventors hereof recognize that such is the nature of the art, and reiterate that the diagram of FIG. 6 is merely illustrative of an exemplary computing device that can be used in connection with one or more aspects of the invention. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. Presentation component(s) 616 present data indications to a user or other device. Exemplary presentation components 616 include a display device, speaker, printing component, vibrating component, etc. I/O ports 618 allow computing device 600 to be logically coupled to other devices including I/O components 620, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 600. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include a radio. The radio transmits and receives radio communications. The computing device may be a wireless terminal adapted to received communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A system for optimizing one or more cloud computing infrastructures functionality based on an abuse prevention and remediation platform, comprising:
   one or more hardware processors and memory storing computer-executable instructions and components embodied thereon that, when executed, by the one or more hardware processors, causes the hardware processors to execute:

a tenant profile component configured for:
  tracking a plurality of tenant profile attributes, the tenant profile attributes facilitating quantifying tenant confidence scores;
  generating a tenant profile comprising a tenant confidence score for a tenant, the tenant profile being associated with the plurality of tenant profile attributes that define the tenant confidence score, the tenant confidence score being generated based on a subscription confidence rating system as an indicator of a reputation of tenant usage of cloud computing resources, wherein the tenant confidence score is established by one or more of the following:
  the tenant having a subscription to a higher level of service of a cloud computing platform,
  the tenant having a record of compliance with the cloud computing platform usage policies, or
  the tenant timely paying for the subscription to the cloud computing platform;
  communicating the tenant confidence score for the tenant; and
a network resource cleanup component configured for:
  determining that a network resource is tainted by at least analyzing packages sent by the network resource, wherein the packages are analyzed to identify known malicious patterns;
  in response to determining that the network resource is tainted, quarantining the network resource in a tainted network resources pool;
    automatically executing a cleanup routine, the cleanup routine communicating remedial actions for the tainted resource; and
    upon completion of the cleanup routine, restoring the network resource in an untainted network resources pool.

2. The system of claim 1 further comprising a network manager component configured for:
  accessing the tenant confidence score associated with the tenant, the tenant confidence score corresponding to the tenant profile of the tenant;
  based on, in part, the tenant confidence score, identifying one or more policies for the tenant, the one or more policies limiting access to cloud computing resources; and
  invoking application of the one or more policies on the tenant infrastructure.

3. The system of claim 2, wherein the network manager component is further configured for:
  accessing the tenant confidence score upon update of the tenant profile;
  adjusting the one or more policies applied to the tenant infrastructure based on a change in the tenant confidence score, wherein the change in the tenant confidence score is based on tracked attributes in the tenant profile; and
  communicating an indication to apply the adjusted one or more policies on the tenant infrastructure.

4. The system of claim 3, wherein adjusting the one or more policies comprises selecting one or more policies that throttle network activity or un-throttle network activity of the tenant infrastructure based on the tenant confidence score.

5. The system of claim 1, wherein the tenant profile attributes include at least one of:
  a history of billing of the tenant;
  a tracked usage behavior of the tenant;
  a service model of the tenant;
  a code of the tenant infrastructure;
  a type of agreement between the tenant and a provider the tenant infrastructure; and
  an authentication of the tenant.

6. The system of claim 5, wherein the tracked usage behavior, the service model, and code of the tenant are compared to known fraudulent usage behavior, service model, and code.

7. The system of claim 1, further comprising:
  a host node having a virtual switch, a virtual machine of the tenant infrastructure, and a network manager agent running on the virtual machine, wherein the virtual switch is configured for:
    identifying the virtual machine of the tenant infrastructure; and
    instructing the network manager agent to implement the one or more policies on the virtual machine.

8. The system of claim 1, wherein the network resource is an internet protocol (IP) address.

9. The system of claim 8, wherein the IP address is a virtual internet protocol address (VIP), the VIP being one of a plurality of VIPs in a cloud computing infrastructure that supports a clean pool of untainted VIPs and a quarantine pool of tainted VIPs.

10. The system of claim 9, further comprising:
  determining that the network resource is tainted based on at least one of:
    receiving an indication that the VIP has been placed on a blacklist; and
    receiving an indication that the VIP has been blocked by a firewall.

11. One or more computer storage media having computer-executable instructions embodied thereon that, when executed, by one or more processors, cause the one or more processors to perform a method for optimizing one or more cloud computing infrastructures functionality based on an abuse prevention and remediation platform, the method comprising:
  tracking a plurality of tenant profile attributes, the tenant profile attributes facilitating quantifying tenant confidence scores;
  generating a tenant profile comprising a tenant confidence score for a tenant, the tenant profile being associated with the plurality of tenant profile attributes that define the tenant confidence score, the tenant confidence score being generated based on a subscription confidence rating system as an indicator of a reputation of tenant usage of cloud computing resources, wherein the tenant confidence score is established by one or more of the following:
  the tenant having a subscription to a higher level of service of a cloud computing platform,
  the tenant having a record of compliance with the cloud computing platform usage policies, or
  the tenant timely paying for the subscription to the cloud computing platform; and
  communicating the tenant confidence score for the tenant, wherein based on the tenant confidence score, selecting one or more policies to apply to the tenant infrastructure to limit access to cloud computing resources.

12. The method of claim 11, further comprising a network manager component configured for:
  accessing the tenant confidence score associated with the tenant, the tenant confidence score corresponding to a tenant profile of the tenant;

based on, in part, the tenant confidence score, identifying one or more policies for the tenant, the one or more policies limiting access to cloud computing resources; and invoking application of the one or more policies on the tenant infrastructure.

13. The method of claim 12, further comprising:

accessing the tenant confidence score upon update of the tenant profile;

adjusting the one or more policies applied to the tenant infrastructure based on a change in the tenant confidence score, wherein the change in the tenant confidence score is based on tracked attributes in the tenant profile; and communicating an indication to apply the adjusted one or more policies on the tenant infrastructure.

14. The method of claim 13, wherein adjusting the one or more policies comprises selecting one or more policies that throttle network activity or un-throttle network activity of the tenant infrastructure based on the tenant confidence score.

15. The method of claim 11, wherein the tenant profile attributes include at least one of:

a history of billing of the tenant;

a tracked usage behavior of the tenant;

a service model of the tenant;

a code of the tenant infrastructure;

a type of agreement between the tenant and a provider the tenant infrastructure; and an authentication of the tenant.

16. The method of claim 15, wherein the tracked usage behavior, the service model, and code of the tenant are compared to known fraudulent usage behavior, service model, and code.

17. The method of claim 11, further comprising:

determining that a network resource associated with the tenant is tainted, wherein based on the tenant confidence score, the tenant initially had one or more policies applied to the tenant infrastructure to limit access to cloud computing resources;

in response to determining that the network resource is tainted, quarantining the network resource in a tainted network resources pool;

automatically executing a cleanup routine, the cleanup routine communicating remedial actions for the tainted resource; and upon completion of the cleanup routine, restoring the network resource in an untainted network resources pool.

18. The method of claim 17, wherein the network resource is an internet protocol (IP) address, wherein the IP address is a virtual internet protocol address (VIP), the VIP being one of a plurality of VIPs in a cloud computing infrastructure that supports a clean pool of untainted VIPs and a quarantine pool of tainted VIPs.

19. The method of claim 17, wherein determining that the network resource associated with the tenant is tainted is based on at least one of:

receiving an indication that the VIP has been placed on a blacklist; and receiving an indication that the VIP has been blocked by a firewall.

20. A method for optimizing one or more cloud computing infrastructures functionality based on an abuse prevention and remediation platform, comprising:

tracking a plurality of tenant profile attributes, the tenant profile attributes facilitating quantifying tenant confidence scores;

generating a tenant profile comprising a tenant confidence score for a tenant, the tenant profile being associated with the plurality of tenant profile attributes that define the tenant confidence score, the tenant confidence score being generated based on a subscription confidence rating system as an indicator of a reputation of tenant usage of cloud computing resources, wherein the tenant confidence score is established by one or more of the following:

the tenant having a subscription to a higher level of service of a cloud computing platform, the tenant having a record of compliance with the cloud computing platform usage policies, or the tenant timely paying for the subscription to the cloud computing platform, and communicating the tenant confidence score for one or more the tenant, wherein based on the tenant confidence score, a network manager component identifies one or more policies for the tenant, the one or more policies limit access to cloud computing resources when applied on the tenant infrastructure.

* * * * *